US011086120B2

(12) United States Patent
Tetaz et al.

(10) Patent No.: US 11,086,120 B2
(45) Date of Patent: Aug. 10, 2021

(54) BIFOCAL ANASTIGMATIC TELESCOPE WITH FIVE MIRRORS

(71) Applicant: THALES, Courbevoie (FR)

(72) Inventors: Nicolas Tetaz, Cannes (FR); Cyril Ruilier, Cannes (FR)

(73) Assignee: THALES, Courbevoie (FR)

( * ) Notice: Subject to any disclaimer, the term of this patent is extended or adjusted under 35 U.S.C. 154(b) by 288 days.

(21) Appl. No.: 15/976,691

(22) Filed: May 10, 2018

(65) Prior Publication Data
US 2018/0335616 A1 Nov. 22, 2018

(30) Foreign Application Priority Data

May 18, 2017 (FR) ...................................... 1700525

(51) Int. Cl.
| | |
|---|---|
| G02B 23/04 | (2006.01) |
| G02B 17/06 | (2006.01) |
| G02B 23/06 | (2006.01) |
| G02B 27/00 | (2006.01) |
| G02C 7/06 | (2006.01) |

(52) U.S. Cl.
CPC ......... *G02B 23/04* (2013.01); *G02B 17/0694* (2013.01); *G02B 23/06* (2013.01); *G02B 27/0012* (2013.01); *G02C 7/06* (2013.01)

(58) Field of Classification Search
CPC .... G02B 23/04; G02B 27/0012; G02B 23/06; G02B 17/0694; G02B 17/0626; G02B 17/0642; G02B 17/0668; G02B 26/06; G02B 26/0825; G02B 17/0631; G02B 27/0025; G02B 7/183; G02B 17/06;
(Continued)

(56) References Cited

U.S. PATENT DOCUMENTS 4,101,195 A * 7/1978 Frosch ............... G02B 17/0631
359/366
4,226,501 A * 10/1980 Shafer ................ G02B 17/0663
359/366

(Continued)

OTHER PUBLICATIONS

Korsch, "Reflective Optics", Academic Press, Technology & Engineering, pp. 261-264, Dec. 2, 2012.

*Primary Examiner* — Stephone B Allen
*Assistant Examiner* — Rahman Abdur
(74) *Attorney, Agent, or Firm* — BakerHostetler

(57) ABSTRACT

A bifocal anastigmatic telescope with five aspherical mirrors, comprises: a concave first mirror, a convex second mirror, a concave third mirror and a first detector, which are common to a first and second focal length of the telescope, a first fourth mirror and a first fifth mirror that are associated with the first focal length, and a second fourth mirror and a second fifth mirror that are associated with the second focal length, the first mirror and the second mirror being arranged to form, from an object at infinity, an intermediate image situated between the second mirror and the third mirror, and for each focal length: the fixed positions and forms of the mirrors associated with the focal length being determined from the generalized Korsch equations with 5 mirrors, with the constraint of the first, second and third mirror and of the first focal plane that are common to the two focal lengths, and so as to optimize the image quality in the first focal plane of the telescope in accordance with a predetermined criterion.

15 Claims, 10 Drawing Sheets

(58) Field of Classification Search
CPC .... G02B 15/00; G02B 27/00; G02B 27/0075; G02B 17/0647; G02C 7/06
See application file for complete search history.

(56) References Cited

U.S. PATENT DOCUMENTS

| | | | | |
|---|---|---|---|---|
| 4,993,818 | A * | 2/1991 | Cook | G02B 17/0694 359/366 |
| 6,084,727 | A | 7/2000 | Cook | |
| 6,333,811 | B1 * | 12/2001 | Tatian | G02B 15/14 359/365 |
| 9,354,116 | B1 * | 5/2016 | Cook | G01J 3/2823 |

* cited by examiner

| | Mirror | Form | Radius(mm) | Conicity | Coeff Asphericity A | distance(mm) |
|---|---|---|---|---|---|---|
| OC1$_i$ | M1$_i$ | Concave | -4000 | -1.02 | x | 1500 |
| | M2$_i$ | Convex | -1364 | -3.19 | x | 3000 |
| | M3$_i$ | Concave | -1756 | -0.40 | x | 1200 |
| | M4$_i$ | Convex | -1673 | x | 0 | 900 |
| | M5$_i$ | Concave | -1955 | x | 0 | 1840 |
| OC2$_i$ | M1$_i$ | Concave | -4000 | -1.02 | x | 1300 |
| | M2$_i$ | Convex | -1364 | -3.19 | x | 2800 |
| | M3$_i$ | Concave | -1756 | -0.39 | x | 900 |
| | M4$_i$ | Convex | -1381 | x | -7.46E-11 | 1200 |
| | M5$_i$ | Concave | -1568 | x | -4.78E-12 | 1040 |

FIG.11

| | Mirror | Form | Radius(mm) | Conicity | Coeff Asphericity | Adistance(mm) |
|---|---|---|---|---|---|---|
| OC1f | M1 | Concave | -4000 | -1.03 | 0 | 1500 |
| | M2 | Convex | -1364 | -3.08 | 0 | 3000 |
| | M3 | Concave | -1756 | -0.39 | 0 | 1200 |
| | M4f | Convex | -2255 | 0 | 3.79E-10 | 900 |
| | M5f | Concave | -2008 | 0 | -1.32E-13 | 1550 |
| OC2f | M1 | Concave | -4000 | -1.03 | 0 | 1500 |
| | M2 | Convex | -1364 | -3.08 | 0 | 3000 |
| | M3 | Concave | -1756 | -0.39 | 0 | 1200 |
| | M4₂ | Convex | -1177 | 0 | 3.05E-10 | 900 |
| | M5₂ | Concave | -1614 | 0 | -4.20E-12 | 1550 |

FIG.13

BIFOCAL ANASTIGMATIC TELESCOPE WITH FIVE MIRRORS

CROSS-REFERENCE TO RELATED APPLICATIONS

This application claims priority to foreign French patent application No. FR 1700525, filed on May 18, 2017, the disclosure of which is incorporated by reference in its entirety.

FIELD OF THE INVENTION

The field of the invention is that of telescopes, and in particular that of observation telescopes on board satellites. More precisely, the field of the invention relates to catoptric systems with large focal lengths that are more particularly bifocal.

BACKGROUND

Current space telescopes have a single focal length. One type of telescope that is known is the Korsch telescope with 3 mirrors, as illustrated in FIG. 1. The Korsch telescope, also referred to as a three-mirror anastigmat (TMA), is a monofocal anastigmatic telescope with three aspherical mirrors (concave-convex-concave) that comprises at least a concave first mirror M1, a convex second mirror M2 and a concave third mirror M3. The first, second and third mirrors M1, M2 and M3 are aspherical, of fixed forms, each mirror being characterized by at least two parameters, a radius of curvature R and a conicity c.

The three mirrors M1, M2 and M3 are arranged so that the first mirror and the second mirror form, from an object at infinity, an intermediate image positioned in an intermediate plane $P_{FI}$ situated between the second mirror M2 and the third mirror M3, the third mirror forming, from this intermediate image, a final image in the focal plane $P_F$ of the telescope, in which plane a detector D is positioned. A deflecting mirror M0 makes it possible to fold the beam so as to reduce the bulk. The final image in the plane $P_F$ is not inverted. The telescope has, as is conventional, an entrance pupil $P_E$ and an exit pupil $P_S$.

By applying the Korsch equations, which are well known to those skilled in the art, the respective positions and parameters of the three mirrors are easily calculated. The theoretical solution exhibits very good quality over a relatively large field and is compact, thereby affording this type of telescope particular benefit as it is particularly well suited for forming systems with a long focal length (>5000 m) and a large pupil (>300 mm).

Moreover, it may be beneficial to be able to change the focal length on-the-fly. Specifically, changing the focal length on-the-fly allows the field of view and/or the resolution of the image to be changed with one and the same instrument. A bifocal solution is already beneficial.

The Korsch equations with 3 mirrors do not allow an achromatic and anastigmatic solution to be achieved for two different focal lengths from one and the same combination of mirrors M1/M2/M3.

Several types of bifocal instruments exist.

A first type is based on the splitting of a common channel into two channels of different focal length by a splitting component 20, such as illustrated in FIG. 2. Each channel then has a dedicated detector, in the example D1 for the short focal length and D2 for the long focal length.

The splitting may be performed spectrally, for example visible and IR, and the component 20 is then a dichroic plate. The splitting may also be performed for one and the same wavelength domain, by a splitter plate (for example 50/50).

This first type of system exhibits the advantage of having the two focal lengths simultaneously and a common field of observation. However, specific components have to be added on each channel, including the detectors, and for a given channel, part of the flux is lost.

A second type performs a split in the field of view, as illustrated in FIG. 3. This is a simultaneous bifocal solution, but the two channels therefore do not have the same field of view, and it is necessary to add optical components on each channel, a deflecting mirror M0(1), M0(2), a third mirror M3(1), M3(2) and a detector D1, D2.

A third type of system, described in document U.S. Pat. No. 6,084,727, allows for changing the focal length by inserting reflective elements into the optical path. There is then a single detector and the two channels have a common field, but it is necessary to add 3 specific mirrors to one of the channels, some of them possibly being of very large size. In addition, the bifocal function is not simultaneous.

A fourth type of system consists in creating a variable focal length by moving a mirror, such as described in document U.S. Pat. No. 6,333,811. This document is based on a Cassegrain telescope with image relay. In a Korsch architecture, it would be necessary to add an additional corrective mirror for each focal length, as well as means for moving the detector or means for varying the optical path on one of the focal lengths. However, this solution exhibits the disadvantage of having to move the mirror M3 of large size in order to vary the focal length.

One aim of the present invention is to mitigate the abovementioned drawbacks by proposing a telescope that makes it possible to retain the advantages of a conventional TMA Korsch architecture (aplanatism and astigmatism over a large field, compactness, single-detector) and that has a bifocal function that is achieved without moving one of the mirrors forming part of the optical combination of the imaging system.

SUMMARY OF THE INVENTION

One subject of the present invention is a bifocal anastigmatic telescope with five aspherical mirrors, comprising:

a concave first mirror, a convex second mirror, a concave third mirror and a first detector, which are common to a first and a second focal length of the telescope, a first fourth mirror and a first fifth mirror that are associated with the first focal length, and a second fourth mirror and a second fifth mirror that are associated with the second focal length, the fourth and the fifth mirror associated with a focal length being retractable, so as to be positioned on an optical path of a beam corresponding to said associated focal length when the telescope is operating at said focal length, and outside of the optical path of a beam corresponding to the other focal length when the telescope is operating at the other focal length, the first mirror and the second mirror being arranged so as to form, from an object at infinity, an intermediate image situated between the second mirror and the third mirror, and for each focal length:

the third mirror as well as the fourth and the fifth mirror that are associated with said focal length being configured to form, from this intermediate image, a final image in a first focal plane of the telescope that is common to the two focal lengths and in which the first detector is positioned, the fixed positions and forms of each mirror being determined from the generalized Korsch equations with 5 mirrors, with the constraint of the first, second and third mirror and of the first focal plane that are common to the two focal lengths, and so as to optimize the image quality in the first focal plane of the telescope in accordance with a predetermined criterion.

According to one embodiment, the first and second fourth mirrors are positioned substantially at one and the same position, and/or the first and second fifth mirrors are positioned substantially at one and the same position.

Preferably, in this embodiment, the first and second fourth mirrors are mounted on a first single carrier, the switch taking place through rotation about a first axis, and/or the first and second fifth mirrors are mounted on a second single carrier, the switch taking place through rotation about a second axis.

Advantageously, the first fourth mirror and the second fourth mirror have a radius of curvature greater than 1000 mm.

Advantageously, the predetermined criterion consists in minimizing a wavefront error.

According to one embodiment, said first and second retractable fourth mirrors are mounted on a single carrier, said carrier furthermore comprising a position in which no retractable fourth mirror is located on the optical path of the beam incident on said carrier, the beam then passing through the carrier along a secondary optical path, the telescope furthermore comprising:

an optical device positioned on the secondary optical path, the optical device being configured to form, from said intermediate image, in combination with the third mirror, a final image on a second focal plane of the telescope corresponding to a chosen focal length and to optimize the image quality in the second focal plane in accordance with said predetermined criterion, and furthermore comprising a second detector positioned in the second focal plane of the telescope, and sensitive in a second spectral band that is different from a first spectral band of sensitivity of the first detector.

Preferably, the optical device operates in transmission mode in the second spectral band.

Advantageously, the first spectral band is contained in the visible and the second spectral band is contained in the infrared.

Advantageously, the chosen focal length has a value less than the first and second focal lengths.

According to another aspect, the invention relates to a method for determining optical combinations of a bifocal anastigmatic telescope with five aspherical mirrors, the telescope comprising:

a first mirror, a second mirror and a third mirror and a first detector positioned in a first focal plane that are common to a first and a second focal length of the telescope, a first fourth mirror and a first fifth mirror that are associated with the first focal length, the respective forms and positions of the first, second, third, first fourth and first fifth mirrors forming a first optical combination associated with the first focal length, a second fourth mirror and a second fifth mirror that are associated with a second focal length, the respective forms and positions of the first, second, third, second fourth and second fifth mirrors forming a second optical combination associated with the second focal length, the method comprising steps consisting in:

A) determining, from the generalized Korsch equations with 5 mirrors, a first initial optical combination for the first focal length, the first mirror being concave, the second mirror being convex, the third mirror being concave, the first and the second mirrors being configured such that they form, from an object at infinity, an intermediate image situated between the second mirror and the third mirror, the third, the first fourth and the first fifth mirrors being configured to form, from said intermediate image, an image in a first initial focal plane of the telescope by optimizing the image quality in said first initial focal plane in accordance with a predetermined criterion, B) determining, from the first initial optical combination and from the generalized Korsch equations with 5 mirrors, a second initial optical combination for the second focal length, by modifying the forms and/or the positions of said third, first fourth and first fifth mirrors that are determined in step A, so as to form, from said intermediate image, an image in a second initial focal plane of the telescope by optimizing the image quality in said second initial focal plane in accordance with said predetermined criterion, C) determining, from the first and second initial optical combinations, a first and a second final optical combination through an optimization loop, with the constraint of the first, second and third mirrors and of the first focal plane that are common to the two focal lengths, and so as to optimize the image quality in said first focal plane of the telescope in accordance with a predetermined criterion.

Preferably, the respective forms of the first fourth and of the first fifth mirror that are determined in step A are mandatorily spherical.

Advantageously, the first focal length is the longest focal length.

Preferably, a mirror form is defined by at least one radius of curvature and a conicity, and the modifications of step B consist, for the third mirror, in modifying only its conicity, that is to say without modifying its radius of curvature or its position.

According to one variant, step C is performed with the additional constraint of the positions of the first and second fourth mirrors being equal, and the positions of the first and second fifth mirrors being equal.

Advantageously, the predetermined criterion consists in minimizing a wavefront error.

BRIEF DESCRIPTION OF THE DRAWINGS

Other features, aims and advantages of the present invention will become apparent on reading the detailed description which will follow and with reference to the appended drawings, which are given by way of non-limiting example and in which:

FIG. 11 illustrates an example of values calculated for the first and second initial combinations of a telescope, resulting from step A and from step B of the method according to the invention, respectively.

FIG. 13 illustrates values calculated for the first and second final combinations from the values of the combinations CO1$i$ and CO2$i$ of FIG. 11.

DETAILED DESCRIPTION

Figure 1:
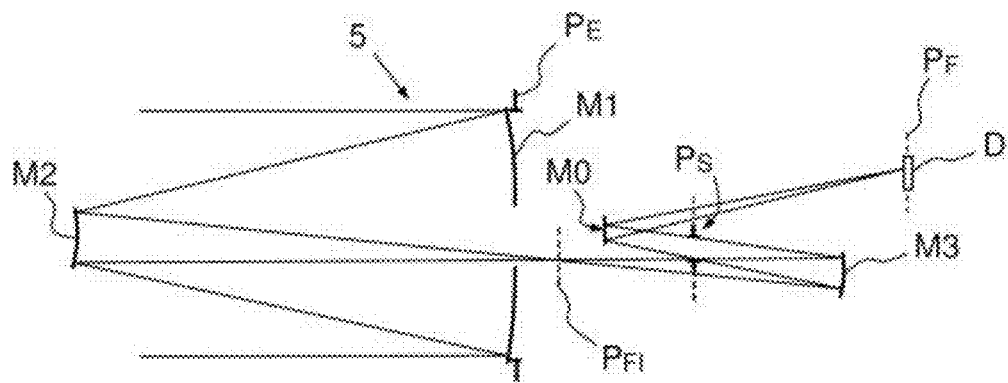
FIG. 1, already cited, illustrates a conventional Korsch architecture with 3 mirrors.
Figure 2:
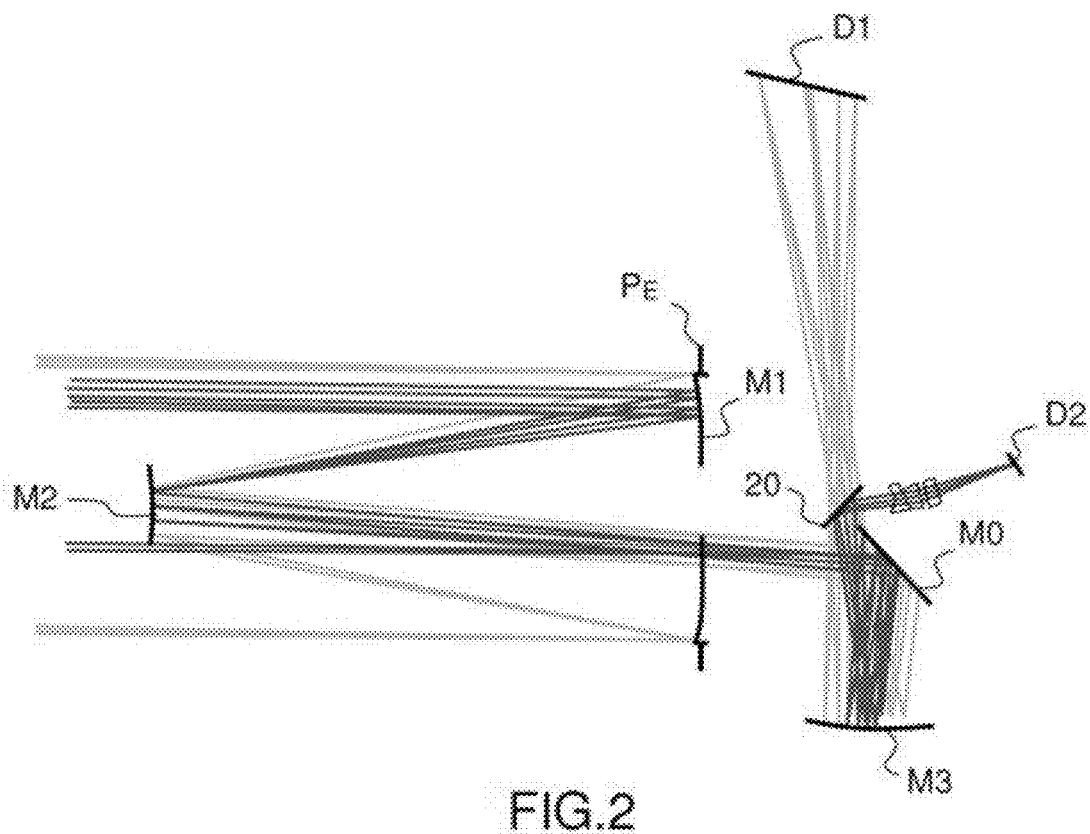
FIG. 2, already cited, describes a first type of bifocal system according to the prior art, using an optical splitter component and having two detectors.
Figure 3:
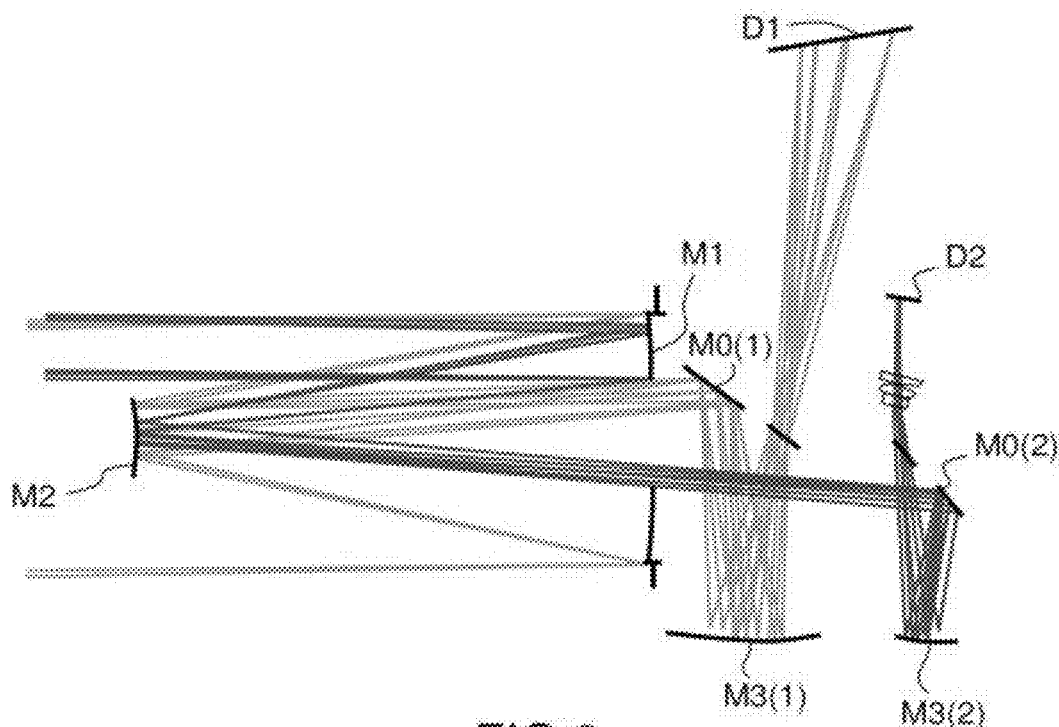
FIG. 3, already cited, illustrates a second type of bifocal system according to the prior art with field splitting.
Figure 4:
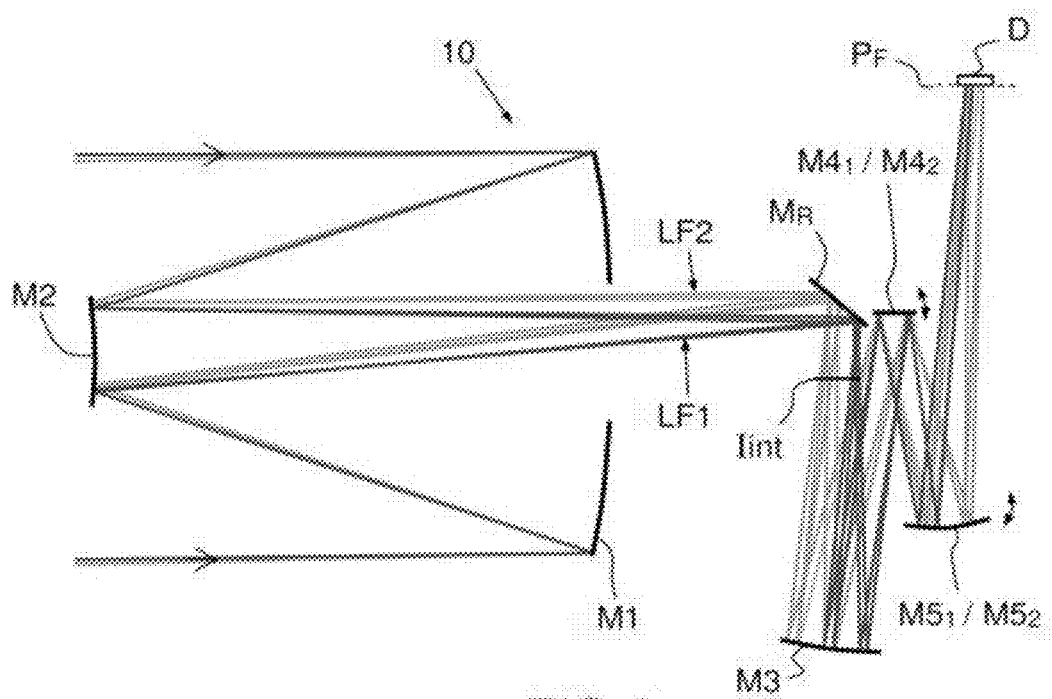
FIG. 4 illustrates a telescope according to the invention.

A bifocal anastigmatic telescope 10 with five mirrors according to the invention is illustrated in FIG. 4. It has a first focal length f1 and a second focal length f2 and comprises a concave first mirror M1, a convex second mirror M2, a concave third mirror M3 and a first detector D that are common to f1 and f2. The mirrors M1 and M2 form, from an object at infinity, an intermediate image Iint situated between M2 and M3.

M1 and M2 are arranged in accordance with the configuration of a Korsch with 3 mirrors, as described in the prior art, and the form of the mirror M3 is modified slightly with respect to the corresponding 3-mirror Korsch as described further on.

The telescope 10 also comprises a first fourth mirror $M4_1$ and a first fifth mirror $M5_1$ that are associated with f1, and a second fourth mirror $M4_2$ and a second fifth mirror $M5_2$ that are associated with f2.

The fourth mirror and the fifth mirror associated with a focal length (f1 or f2) are retractable, so as to be positioned on the optical path of the light beam corresponding to said associated focal length when the telescope is operating at said focal length, and outside of the optical path of a beam corresponding to the other focal length when the telescope is operating at the other focal length. The first light beam LF1, corresponding to the use at focal length f1, and the second light beam LF2, corresponding to the use at focal length f2, thus substantially share one and the same optical path, as illustrated in FIG. 4.

In other words, the telescope has a first optical combination OC1 for the focal length f1 consisting of the respective forms and positions of M1/M2/M3/$M4_1$/$M5_1$, and a second optical combination OC2: M1/M2/M3/$M4_2$/$M5_2$ for the focal length f2. A change is made from OC1 to OC2 by retracting the mirrors M4 and M5 of the focal length not being used and by positioning the mirrors M4 and M5 of the focal length being used on the path of the incident light beam.

Furthermore, for each focal length, the third mirror M3 as well as the fourth and the fifth mirror that are associated with said focal length are configured to form, from this intermediate image Iint, a final image in a first focal plane $P_F$ of the telescope that is common to the two focal lengths f1 and f2 and in which the first detector D is positioned.

The form and the position of each mirror are fixed. They are determined from the generalized Korsch equations with 5 mirrors, with the constraint of M1, M2, M3 and $P_F$ that are common to the two focal lengths, and so as to optimize the image quality in $P_F$ only of the telescope in accordance with a predetermined criterion. This architecture is termed 5MA for '5-mirror anastigmat'. Typically, the predetermined criterion consists in minimizing a wavefront error WFE.

The Korsch equations allow, for a given focal length, for finding an aplanatic and anastigmatic solution by calculating the position and the form of the mirrors M1, M2 and M3. The calculation is strict at the centre of the field, but this means that optimization of the image quality is able to be excellent in the field (generally field <3°×0.5°).

For a monofocal solution, 3 mirrors are required and sufficient to remove the 1st order spherical aberration, the astigmatism, the coma and the field curvature.

However, for a multifocal solution, it is not possible to solve the equations, even by moving the mirror M3.

The general idea is to achieve a telescope according to the invention in which all of the mirrors are fixed (including M3, which could constitute a means for changing the focal length). In order to be able to fix the position of M3, as well as that of the detector D, while at the same time retaining a good image quality for f1 and f2, it is then necessary to add two additional mirrors M4 and M5 to the optical combination, hence the 5MA architecture.

A change is then made from one focal length to the other by changing the mirrors M4 and M5 by retracting them from/positioning them in the optical path depending on the desired focal length. The optical combinations are made more complex (5 aspherical mirrors rather than 3) so as to drastically simplify the focal length-changing mechanism.

Calculation of the optical combinations of the telescope 10 according to the invention results from the application of the generalized Korsch equations with n mirrors, where n=5. In his book 'Reflective Optics', D. Korsch presents a mathematical formalism allowing, in multi-mirror systems, for the expression of the main optical aberrations (spherical aberration, coma, astigmatism, field curvature) as a function of simple parameters, such as the distance between the mirrors, the distance from the objects and the images and the ratio of the heights of the radii. This simple and effective formalism allows for finding aplanatic and anastigmatic multi-mirror systems by solving a few equations.

By applying these equations, combinations OC1 and OC2 that satisfy the abovementioned properties are determined. The final image is not inverted, and the diameter of the entrance pupil is constant for the 2 focal lengths.

An example of a method for determining the forms and positions of the 7 mirrors of the telescope 10 is given further on.

Typically, there is M1 concave/M2 convex/M3 concave/M4 convex or concave and almost planar (large radius of curvature)/M5 convex or concave.

The telescope according to the invention thus has the noteworthy property of being able to change focal length without mirror movement (such as a translation) by simply switching between $M4_1$ and $M4_2$ and between $M5_1$ and $M5_2$, the other mirrors M1/M2/M3 remaining fixed.

Furthermore, it has an optical length (as far as the detector) that is equal for the two focal lengths.

The telescope 10 also has, for the 2 focal lengths, the conventional advantages of a Korsch: compactness, good image quality, relatively large accessible field of view, etc.

Furthermore, this type of telescope, with a 100% reflective architecture, exhibits the advantage of operating independently of wavelength since the mirrors do not produce chromatic aberration. The spectral band of operation is then determined by the nature of the reflective material of the mirrors and the spectral band of sensitivity of the first detector.

A telescope is achieved with a ratio at least equal to 2.5, and the accessible focal lengths are typically greater than 5 m (generally around 20 m for the long focal length), a pupil larger than 300 mm and a linear field of view of up to 5°×1°.

To facilitate implementation, the first and second fourth mirrors $M4_1$, $M4_2$ are calculated so as to be positioned substantially at one and the same position. The same applies for the first and second fifth mirrors $M5_1$, $M5_2$. In this configuration, according to one preferred embodiment, $M4_1$ and $M4_2$ are mounted on a first single carrier and/or $M5_1$ and $M5_2$ are mounted on a second single carrier. Preferably, the switch takes place through rotation about an axis of the carrier using what is called a 'flip/flop' mechanism.

Preferably, the first fourth mirror $M4_1$ and the second fourth mirror $M4_2$ have a radius of curvature greater than 1000 mm, as explained further on.

For the compactness constraints, according to one embodiment, the telescope 10 according to the invention comprises a deflecting mirror $M_R$.

Figure 5:
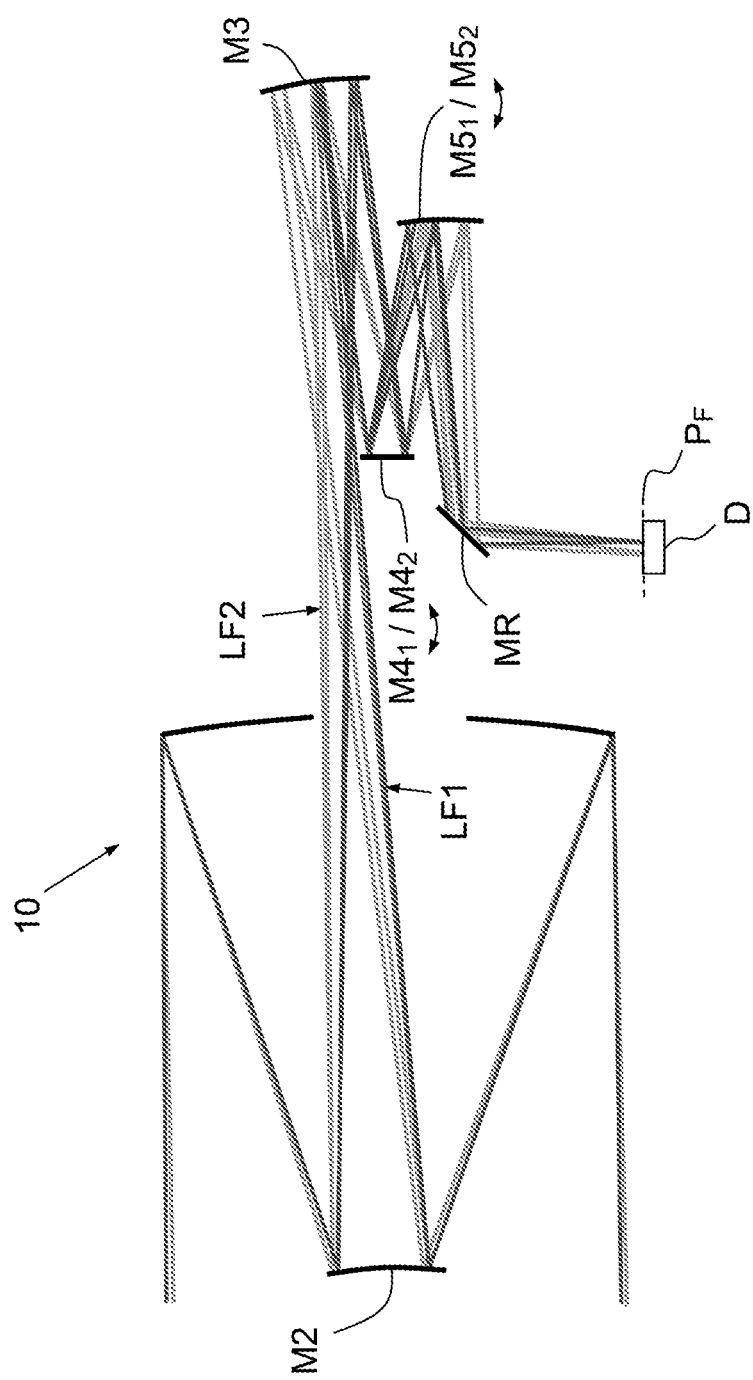
FIG. 5 illustrates another embodiment of a telescope according to the invention, in which the deflecting mirror is positioned differently.

FIG. 5 illustrates another embodiment, in which the deflecting mirror $M_R$ is positioned differently.

Figure 6:
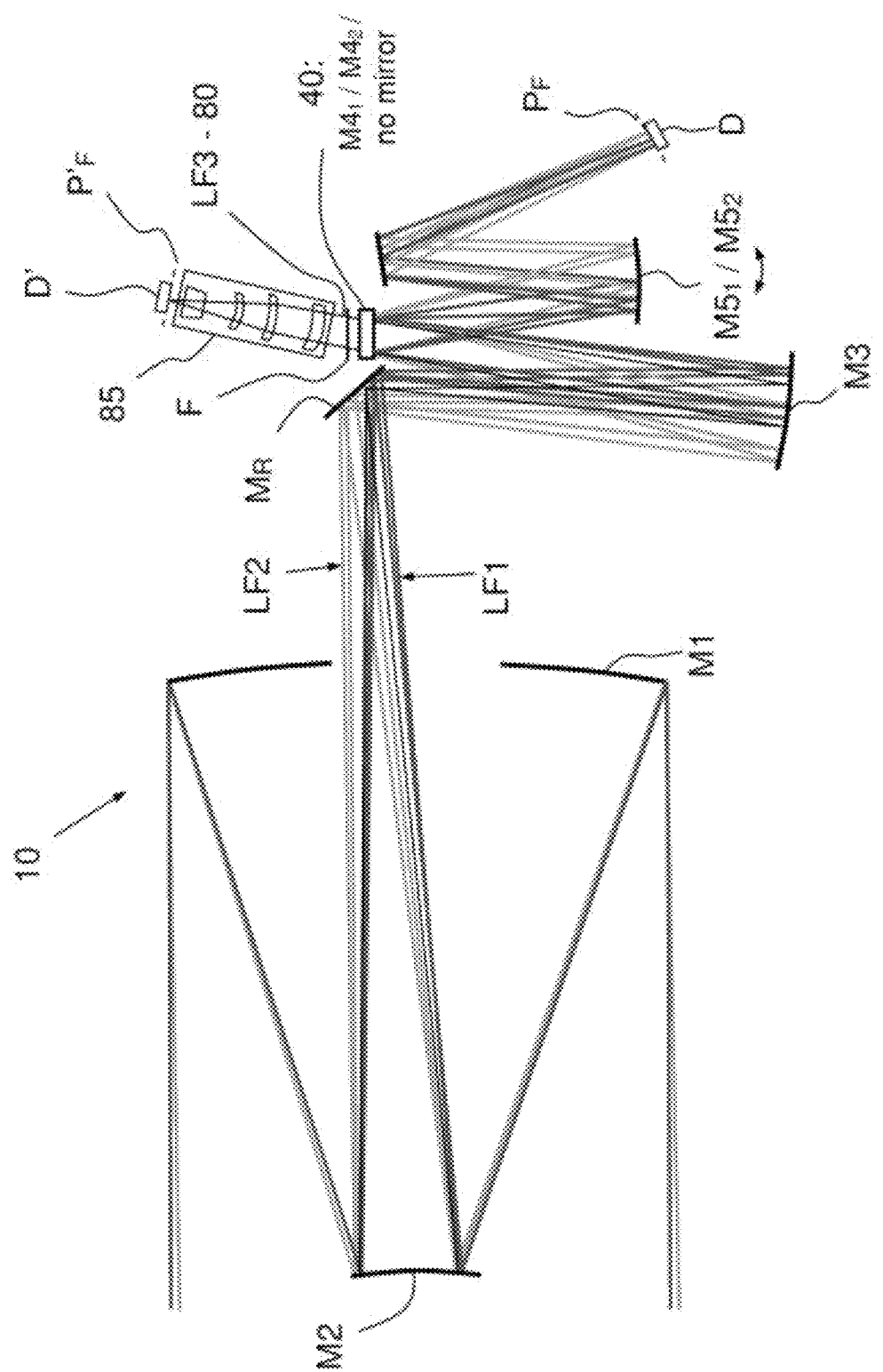
FIG. 6 illustrates a variant of the telescope according to the invention, which comprises an additional channel operating in a wavelength range different from the operating range of the main channel of the telescope.

According to one variant, the telescope 10 comprises an additional channel operating in a wavelength range different from the operating range of the main channel of the telescope, an example of an architecture of this telescope being illustrated in FIG. 6.

The main bifocal channel operates over a first wavelength range SB1, typically the visible between 400 and 800 nm, and the sensitivity of the first detector D is suitable for SB1. The additional channel operates in a second spectral band SB2 that is different from SB1, typically contained in the infrared band.

Figure 7:
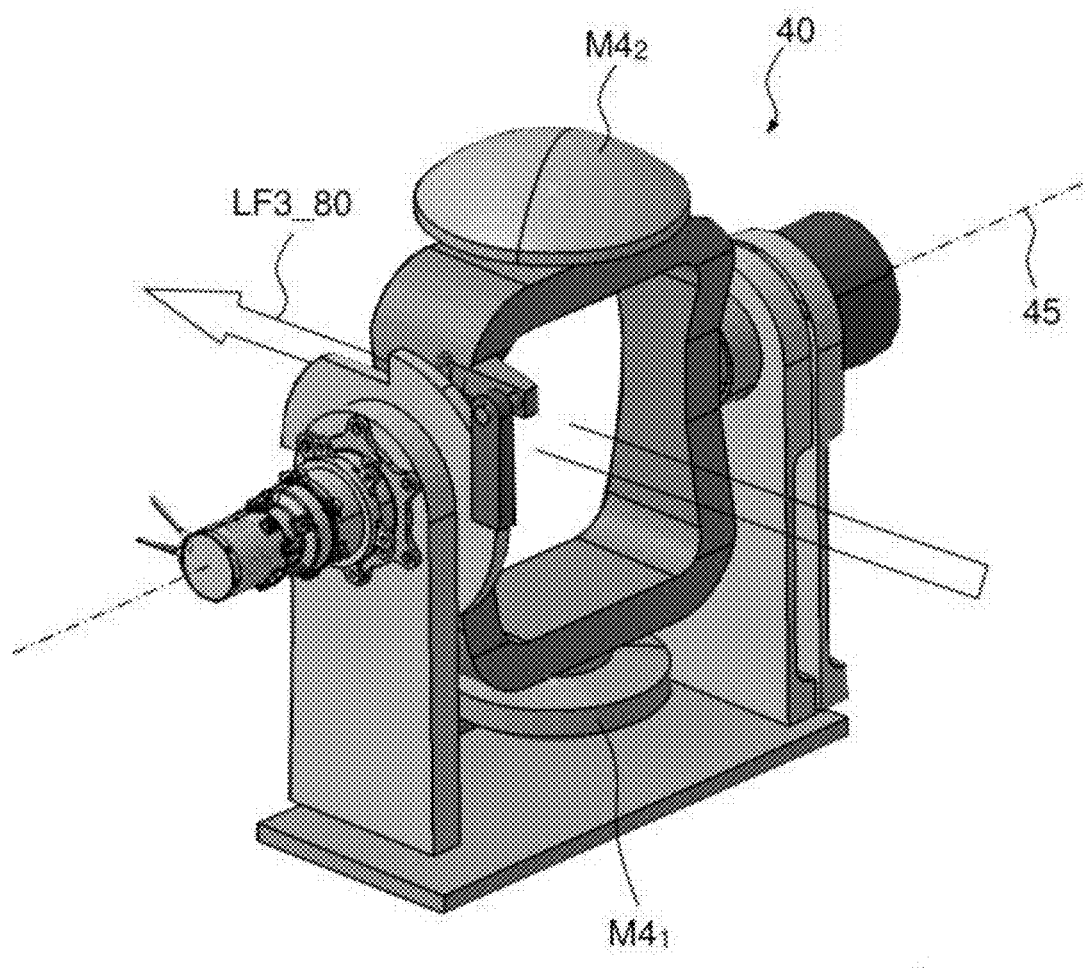
FIG. 7 illustrates a single carrier for the first and second retractable fourth mirrors, suitable for the variant of the telescope of FIG. 6.

The first retractable fourth mirror $M4_1$ and the second retractable fourth mirror $M4_2$ are mounted on a single carrier 40, an example of which carrier is given in FIG. 7.

This carrier furthermore has a neutral position in which no retractable fourth mirror $M4_1$ and $M4_2$ is located on the optical path of the optical beam incident on the carrier (simple hole with no optical function). The beam then passes through the carrier 40 so as to form a light beam LF3 along a secondary optical path 80, the primary optical path being the one taken by the visible channel.

According to the example of FIG. 7, the carrier 40 comprises three positions, respectively obtained by pivoting about an axis of rotation 45, the two aspherical mirrors $M4_1$ and $M4_2$ being mounted about a hollow structure. In a first position it is $M4_1$ that reflects the incident beam, in a second position it is $M4_2$ that reflects the incident beam, and in a neutral third position the incident beam passes through the carrier. Other designs are of course possible, such as a bush wheel.

This multi-channel telescope 10 furthermore comprises an optical device 85 positioned on the secondary optical path 80 and configured to form, from the intermediate image Iint, in combination with the third mirror M3, a final image on a second focal plane $P'_F$ of the telescope corresponding to a chosen focal length f'.

The optical device 85 preferably operates in transmission mode in the second band SB2, so as to be compatible with a focal length f' value that is chosen to be much smaller than f1 and f2.

The device 85 is furthermore configured to correct the compensable aberrations of the telescope and to optimize image quality in the second focal plane $P'_F$ of the telescope in accordance with the predetermined criterion.

It performs the same compensating function as the aspherical mirrors $M4_1/M5_1$, $M4_2/M5_2$. It is typically a dioptric objective composed of a plurality of lenses. Because of the flexibility of the design, the lenses may be spherical while at the same time performing the compensating function.

A second detector D' is positioned in the second focal plane $P'_F$ of the telescope, and is sensitive in the second spectral band SB2. A spectral filter F is preferably positioned on the secondary optical path, between the carrier 40 and the second detector D' in order to select the spectral band SB2 and reflect light out of SB2, so as to prevent stray light.

Thus, an additional channel is achieved with little mechanical complexification.

For the example of a telescope 10 having a bifocal main channel in the visible and a monofocal infrared additional channel on board a satellite, it is sought to achieve an infrared channel with lower resolution than the visible channel, but with a larger field, this being achieved with a focal length f' that is shorter, typically by a factor of 10, with respect to the shortest focal length out of f1 and f2. For example, a focal length in the visible may be of the order of ten metres, and an IR focal length of the order of one metre.

With the position of the mirror M3 for operation in infrared being identical, a simultaneous visible/IR measurement is possible for one of the visible focal lengths f1 or f2.

According to another aspect, the invention relates to a method 100 for determining optical combinations of a bifocal anastigmatic telescope with five aspherical mirrors, the telescope comprising a first mirror M1, a second mirror M2 and a third mirror M3 and a first detector D positioned in a first focal plane $P_F$ that are common to a first focal length f1 and a second focal length f2 of the telescope.

The telescope furthermore comprises a first fourth mirror $M4_1$ and a first fifth mirror $M5_1$ that are associated with f1, and a second fourth mirror $M4_2$ and a second fifth mirror $M5_2$ that are associated with f2.

The respective forms and positions of the first, second, third, first fourth and first fifth mirrors form a first optical combination associated with the first focal length: $M1/M2/M3/M4_1/M5_1$ The respective forms and positions of the first, second, third, second fourth and second fifth mirrors form a second optical combination associated with the second focal length: $M1/M2/M3/M4_2/M5_2$.

These mirrors are aspherical.

The method 100 according to the invention makes it possible to determine the first optical combination OC1 and the second optical combination OC2 that are associated with f1 and f2 of the 5MA telescope, respectively, having the three identical first mirrors M1/M2/M3, and a common focal plane $P_F$.

According to one preferred variant, the respective positions of $M4_1$ and $M4_2$ are identical, as are the respective positions of $M5_1$ and $M5_2$. This makes it possible, as seen above, to change the focal length by toggling a single carrier for each of the fourth and the fifth mirror.

Figure 8:
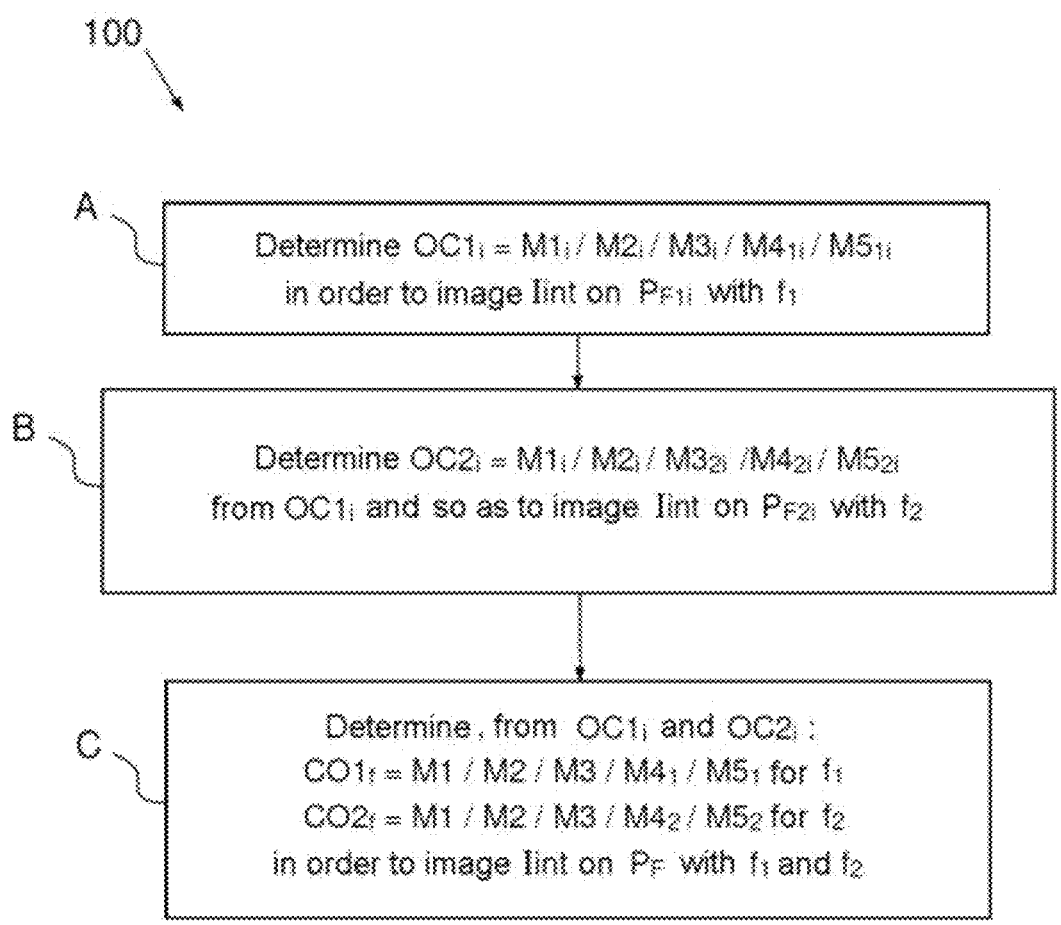
FIG. 8 illustrates the method for calculating optical telescope combinations according to the invention.

The method 100 illustrated in FIG. 8 has a first step A that consists in determining, from the generalized Korsch equations with 5 mirrors, a first initial optical combination OC1*i* for the first focal length f1:

$$OC1i:M1_i/M2_i/M3_{1i}/M4_{1i}/M5_{1i}$$

The first mirror M1$_i$ is concave, the second mirror M2$_i$ is convex, the third mirror M3$_{1i}$ is concave. The first and the second mirror are configured so as to form, from an object at infinity, an intermediate image Iint situated between the second mirror and the third mirror.

Figure 9:
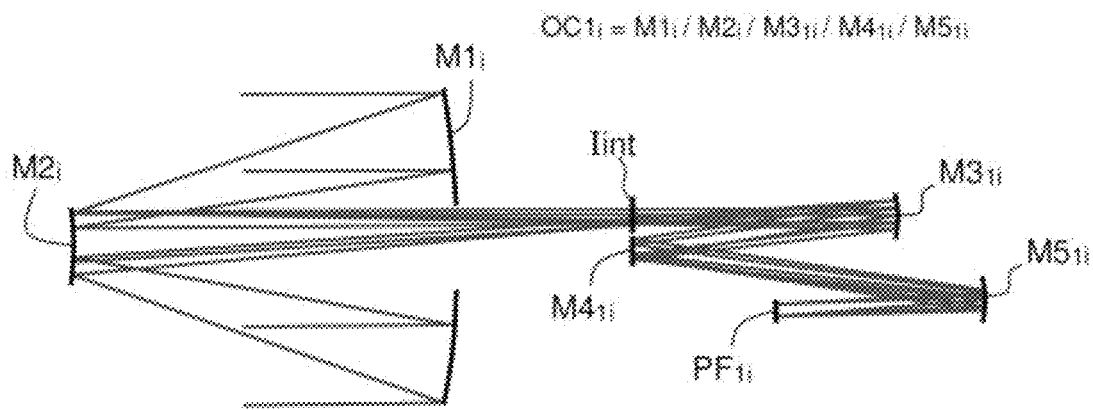
FIG. 9 illustrates the first initial combination resulting from step A of the method according to the invention.

The third M3$_{1i}$, the first fourth M4$_{1i}$ and the first fifth M5$_{1i}$ mirrors are configured to form, from said intermediate image Iint, an image in a first initial focal plane P$_{F1i}$ of the telescope by optimizing the image quality in this first initial focal plane P$_{F1i}$ in accordance with a predetermined criterion. Preferably, the predetermined criterion consists in minimizing a wavefront error WFE. An example of this first initial optical combination is illustrated in FIG. 9.

There is an actual intermediate pupil close to M4$_{1i}$. Specifically, in order to effectively correct the constant aberrations in the field, the mirror M4$_{1i}$ has to be positioned close to the intermediate pupil (i.e. the image of the entrance pupil by M1, M2 and M3).

An aspherical mirror is characterized by at least one radius of curvature (spherical component) and a conicity or one or more coefficient(s) of asphericity (aspherical component). When the mirror becomes close to a plane mirror (very large radius of curvature), it turns out to be more effective to characterize it by the coefficient of asphericity A rather than by a conicity.

Preferably, to speed up the calculations, the conicity of the mirrors M4$_{1i}$ and M5$_{1i}$ (or their coefficient of asphericity) is set to 0, that is to say that they are spherical mirrors. Specifically, asphericity of these mirrors is not necessary for the first focal length f1 to be aplanatic and anastigmatic.

Preferably, step A is implemented for the longest focal length, in this case f1.

In a step B, from the first initial optical combination OC1*i* and from the generalized Korsch equations with 5 mirrors, a second initial optical combination OC2*i* for the second focal length f2 is determined.

The calculation is performed starting from OC1*i* and by modifying the forms and/or the positions of the third, first fourth and first fifth mirrors of OC1*i* determined in step A so as to form, from the intermediate image Iint, an image in a second initial focal plane P$_{F2i}$ of the telescope by optimizing the image quality in this plane P$_{F2i}$ in accordance with the predetermined criterion, with operation at a focal length f2. The positions and forms of M1*i* and M2*i* are kept identical.

$$OC2i:M1_i/M2_i/M3_{2i}/M4_{2i}/M5_{2i}.$$

Figure 10:
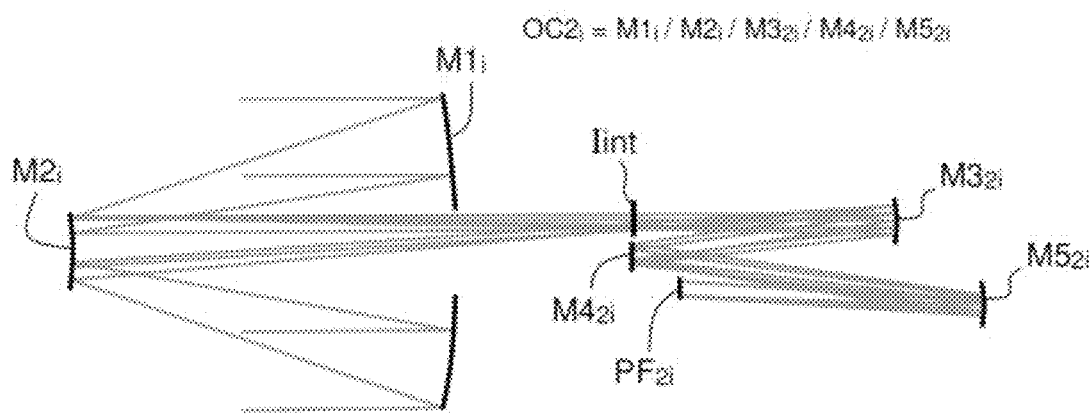
FIG. 10 illustrates the second initial combination resulting from step B of the method according to the invention.

The focal plane P$_{F2i}$ is a result of the calculation using the Korsch equations in order to achieve an aplanatic and anastigmatic image without field curvature. The variables of the optimization are the parameters of the abovementioned mirrors. An example of a second initial combination OC2*i* is illustrated in FIG. 10.

Preferably, in this step B, the modifications consist, for the third mirror, in modifying only its conicity, that is to say not its radius of curvature or its position. Specifically, it is ultimately sought to obtain a single mirror M3 for the 2 focal lengths, and a position and a radius of curvature that are identical to the focal length f1 are therefore targeted, and the conicity, for its part, is determined by the Korsch equations.

FIG. 11 gives an example of calculation of values of OC1*i* and OC2*i* or a bifocal telescope having an entrance pupil of 500 mm, a first focal length f1 of 10 m (long) and a second focal length f2 of 6.7 m.

The distance on the row of a mirror is read as being the distance between this mirror and the following one.

This calculation corresponds to the variant for which only the conicity of M3 is modified, which conicity changes from −0.4 for OC1*i* to −0.39 for OC2*i*, the radius of curvature and the position (with respect to M2) remaining identical. The calculation is initialized with M4$_{1i}$ and M5$_{1i}$ spherical.

The elements that therefore vary between OC1*i* and OC2*i* are the conicity of the third mirror, the radii of curvature of the fourth and fifth mirrors as well as the form thereof, which becomes aspherical, and the position of the fifth mirror, which is modified slightly. The coefficient of asphericity A is chosen to characterize the asphericity of M4$_{2i}$ and M5$_{2i}$.

Lastly, in a step C, there is determined, from the first initial optical combination OC1*i* and from the second initial optical combination OC2*i*, a first final optical combination OC1*f* and a second final optical combination OC2*f* through an optimization loop, with the constraint of the first, second and third mirrors (M1, M2, M3) and of the first focal plane (P$_F$) that are common to the two focal lengths (f1, f2), and so as to optimize the image quality in said first focal plane (P$_F$) of the telescope in accordance with a predetermined criterion. In the optimization, the forms and positions of all of the mirrors may vary with respect to the starting points OC1*i* and OC2*i*. Preferably, as it is not beneficial, the positions of M1 and M2 are not modified.

The field angle (off axis) is adapted to each focal length in order to be able to adjust the optical beams LF1 and LF2.

Figure 12:
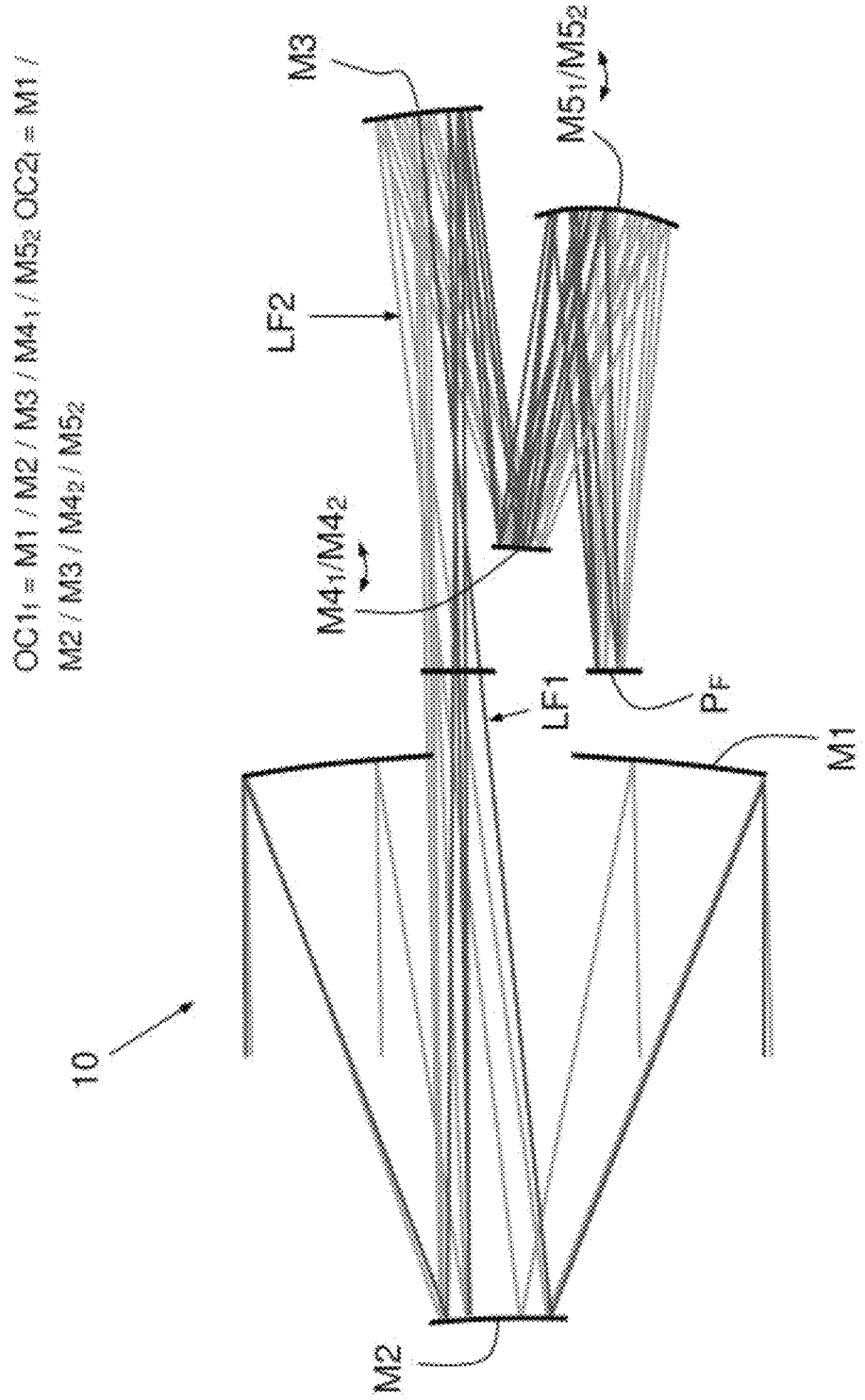
FIG. 12 illustrates an example of a final combination of a telescope according to the invention resulting from the method according to the invention.

An example of a final combination of a telescope 10 according to the invention resulting from the method 100 according to the invention is given in FIG. 12.

Preferably, as illustrated in FIG. 12, the optimization is performed with the additional constraint of the positions of M4$_1$ and M4$_2$ being identical, and the positions of M5$_1$ and M5$_2$ being identical, so as to make the focal length change easier, by simply toggling the fourth mirror between M4$_1$ and M4$_2$ and the fifth mirror between M5$_1$ and M5$_2$ by rotation about an axis ('flip/flop').

In this case, this involves, using the two initial combinations CO1*i* and CO2*i* as a starting point, determining, through optimization, the final combinations OC1*f* and OC2*f* having the best image quality while at the same time sharing a common focal plane P$_F$ in which the first detector D is positioned. This optimization is performed with conventional optical calculation software of CodeV or Zemax type, allowing the error function of the optimization macro that is created to be minimized.

According to one embodiment, the radius of curvature of M4$_1$ associated with the longest focal length is greater than or equal to 10 000 mm.

FIG. 13 illustrates values calculated for the combinations CO1*f* and CO2*f* from the examples of values of the combinations CO1*i* and CO2*i* of FIG. 11.

It is noted that the conicities of the mirrors M1 and M2 have changed very slightly with respect to the values of M1*i* and M2*i*.

More generally, it would also have been possible to have a slight variation of the radii of curvature of M1 and M2 and of the position of M3.

The conicity of M3 has stabilized at −0.39. More generally, it could have changed more significantly.

The forms and positions of M4$_1$, M4$_2$, M5$_1$ and M5$_2$ have also changed, the positions of M4$_1$ and M4$_2$ having been made equal during the optimization so as to be compatible with a single carrier, likewise for the positions of $M5_1$ and $M5_2$.

The invention claimed is:

1. A bifocal anastigmatic Korsch telescope with five aspherical mirrors, comprising:
   a concave first mirror, a convex second mirror, a concave third mirror and a first detector, which are common to a first and a second focal length of the Korsch telescope,
   a first fourth mirror and a first fifth mirror that are associated with the first focal length, and a second fourth mirror and a second fifth mirror that are associated with the second focal length,
   the first, fourth, and fifth mirrors associated with the first focal length, and the second fourth and fifth mirrors associated with the second focal length being retractable, so as to be positioned on an optical path of a beam corresponding to said associated focal length when the Korsch telescope is operating at said focal length, and outside of the optical path of a beam corresponding to the other focal length when the Korsch telescope is operating at the other focal length,
   the first mirror and the second mirror being arranged so as to form, from an object at infinity, an intermediate image situated between the second mirror and the third mirror,
   and for each focal length:
      the third mirror as well as the fourth and the fifth mirror that are associated with said focal length being configured to form, from this intermediate image, a final image in a first focal plane of the Korsch telescope that is common to the two focal lengths and in which the first detector is positioned,
      the fixed positions and forms of each mirror being determined with the constraint of the first, second and third mirror and of the first focal plane that are common to the two focal lengths, and so as to optimize the image quality in the first focal plane of the Korsch telescope in accordance with a predetermined criterion.

2. The Korsch telescope according to claim 1, wherein the first and second fourth mirrors are positioned substantially at one and the same position, and/or wherein the first and second fifth mirrors are positioned substantially at one and the same position.

3. The Korsch telescope according to claim 2, wherein the first and second fourth mirrors are mounted on a first single carrier, the switch taking place through rotation about a first axis, and/or wherein the first and second fifth mirrors are mounted on a second single carrier, the switch taking place through rotation about a second axis.

4. The Korsch telescope according to claim 1, wherein the first fourth mirror and the second fourth mirror have a radius of curvature greater than 1000 mm.

5. The Korsch telescope according to claim 1, wherein the predetermined criterion consists in minimizing a wavefront error.

6. The Korsch telescope according to claim 1, wherein said first and second retractable fourth mirrors are mounted on a single carrier, said carrier furthermore comprising a position in which no retractable fourth mirror is located on the optical path of the beam incident on said carrier, the beam then passing through the carrier along a secondary optical path, the Korsch telescope further comprising:
   an optical device positioned on the secondary optical path, the optical device being configured to form, from said intermediate image, in combination with the third mirror, a final image on a second focal plane of the Korsch telescope corresponding to a chosen focal length and to optimize the image quality in the second focal plane in accordance with said predetermined criterion,
   and further comprising a second detector positioned in the second focal plane of the Korsch telescope, and sensitive in a second spectral band that is different from a first spectral band of sensitivity of the first detector.

7. The Korsch telescope according to claim 6, wherein the optical device operates in transmission mode in the second spectral band.

8. The Korsch telescope according to claim 6, wherein the first spectral band is contained in the visible and the second spectral band is contained in the infrared.

9. The Korsch telescope according to claim 6, wherein the chosen focal length has a value less than the first and second focal lengths.

10. A method for determining optical combinations of the bifocal anastigmatic Korsch telescope of claim 1, the method comprising steps of:
   A) determining a first initial optical combination for the first focal length,
      the first mirror being concave, the second mirror being convex, the third mirror being concave, the first and the second mirrors being configured such that they form, from an object at infinity, an intermediate image situated between the second mirror and the third mirror,
      the third, the first fourth and the first fifth mirrors being configured to form, from said intermediate image, an image in a first initial focal plane of the Korsch telescope by optimizing the image quality in said first initial focal plane in accordance with a predetermined criterion,
   B) determining, from the first initial optical combination, a second initial optical combination for the second focal length, by modifying the forms and/or the positions of said third, first fourth and first fifth mirrors that are determined in step A, so as to form, from said intermediate image, an image in a second initial focal plane of the Korsch telescope by optimizing the image quality in said second initial focal plane in accordance with said predetermined criterion,
   C) determining, from the first and second initial optical combinations, a first and a second final optical combination through an optimization loop, with the constraint of the first, second and third mirrors and of the first focal plane that are common to the two focal lengths, and so as to optimize the image quality in said first focal plane of the Korsch telescope in accordance with a predetermined criterion.

11. The method according to claim 10, wherein the respective forms of the first fourth and of the first fifth mirrors that are determined in step A are mandatorily spherical.

12. The method according to claim 10, wherein the first focal length is the longest focal length.

13. The method according to claim 10, wherein a mirror form is defined by at least one radius of curvature and a conicity, and wherein the modifications of step B consist, for the third mirror, in modifying only its conicity, that is to say without modifying its radius of curvature or its position.

14. The method according to claim 10, wherein step C is performed with the additional constraint of the positions of the first and second fourth mirrors being equal, and the positions of the first and second fifth mirrors being equal.

15. The method according to claim 10, wherein the predetermined criterion consists in minimizing a wavefront error.

\* \* \* \* \*